(12) United States Patent
Winternitz (10) Patent No.: US 8,713,514 B2
(45) Date of Patent: Apr. 29, 2014

(54) HETEROGENEOUS LANGUAGE DATA TYPING WITHOUT EXECUTABLE REGENERATION

(75) Inventor: Fabian Winternitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 13/102,125

(22) Filed: May 6, 2011

(65) Prior Publication Data

US 2012/0284685 A1    Nov. 8, 2012

(51) Int. Cl.
*G06F 9/44* (2006.01)
*G06F 9/45* (2006.01)

(52) U.S. Cl.
USPC ............ 717/104; 717/105; 717/120; 717/141

(58) Field of Classification Search
None
See application file for complete search history.

(56) References Cited

U.S. PATENT DOCUMENTS

| | | | | |
|---|---|---|---|---|
| 5,963,934 | A * | 10/1999 | Cochrane et al. | 707/999.002 |
| 7,181,435 | B2 | 2/2007 | Cambot et al. | |
| 7,219,338 | B2 * | 5/2007 | Venter | 717/140 |
| 7,360,202 | B1 | 4/2008 | Seshadri et al. | |
| 7,500,225 | B2 | 3/2009 | Khan et al. | |
| 2004/0093356 | A1 * | 5/2004 | Sharpe et al. | 707/200 |
| 2005/0262488 | A1 * | 11/2005 | Wagner et al. | 717/144 |

OTHER PUBLICATIONS

Strein, et al., "Cross-Language Program Analysis and Refactoring", Retrieved at <<http://citeseerx.ist.psu.edu/viewdoc/download-?doi=10.1.1.131.2774&rep=rep1&type=pdf>>, Sixth IEEE International Workshop on Source Code Analysis and Manipulation (SCAM), Sep. 27-29, 2006, pp. 10.
"An Overview of Key New Visual Studio 2005 Features", Retrieved at <<http://msdn.microsoft.com/en-us/library/ms364072(v=vs.80).aspx>>, Nov. 2005, pp. 54.
Sheldon, William., "Refactoring: C#'s Cool New Feature", Retrieved at <<http://www.sqlmag.com/article/visual-basic-vb/refactoring-c-s-cool-new-feature.aspx>>, Oct. 15, 2004, pp. 3.
Kehayias, Jonathan, "The Rambling DBA", Retrieved at <<http://sqlblog.com/blogs/jonathan_kehayias/archive/2009/05/16/sql-server-management-studio-addins-would-you-use-them.aspx>>, Retrieved Date: Feb. 28, 2011, pp. 6.
Chand, Mahesh., "Refactoring in Visual Studio 2005", Retrieved at http://www.c-sharpcorner.com/UploadFile/mahesh/VS2005Refactoring11152005043641AM/VS2005Refactoring.aspx>>, Jun. 11, 2004, pp. 7.

(Continued)

*Primary Examiner* — Qamrun Nahar
(74) *Attorney, Agent, or Firm* — Nicholas Chen; Kate Drakos; Micky Minhas (57) ABSTRACT

Data typing information for heterogeneous language components is obtained during software development without requiring executable regeneration. After source code is changed, dependent compiled components, which are written in multiple high-level programming languages, are identified. A query engine obtains data typing information of the dependent components, such as function signatures and class definition, directly from internal compiler-created structures for the respective programming languages. Through a synchronizer, a shared model is automatically populated with the data typing information. The updated model supports cross-language software development operations such as autocompletion, refactoring, dependency finding, and definition go-to, without regeneration of an executable code unit which reflects the changed source code. In cases involving SQL or Transact-SQL (T-SQL), a Data Definition Language file can be automatically generated from the data typing information.

20 Claims, 3 Drawing Sheets

(56) References Cited

OTHER PUBLICATIONS

"Microsoft Visual Studio", Retrieved at <<http://en.wikipedia.org/wiki/Microsoft_Visual_Studio>>, Retrieved Date: Feb. 28, 2011, pp. 23.

".Net Framework", Retrieved at <<http://en.wikipedia.org/wiki/NET_Framework, Apr. 1, 2011, pp. 9.

"[Antlr-interest] Antlr v3.0ea8 : @header not taken intoaccountinautomatically generated lexer java code . . .", Retrieved at <<http://www.antlr.org/pipermail/antlr-interest/2006-May/016167.html, May 4, 2006, pp. 1.

Murali Krishnan Gunasekaran, "Component-based application development using a Mixed-Language Programming (MLP) approach", Retrieved at <<www.dept.aoe.vt.edu/~brown/VTShipDesign/.../3_MuraliKrishnanThesis.pdf, Dec. 2003, pp. 75.

"Common Language Infrastructure", Retrieved at http://en.wikipedia.org/wiki/Common_Language_Infrastructure, Apr. 2, 2011, pp. 3.

"Common Type System", Retrieved at <<http://en.wikipedia.org/wiki/Common_Type—System>>, Dec. 11, 2010, pp. 4.

Carsten A. Arnholm, "Mixed language programming using C++ and FORTRAN 77", Retrieved at <<http://arnholm.org/software/cppf77/cppf77.htm#Section1.1>>, May 28, 1997, pp. 27.

"Mixed-Language Programming: Overview", Retrieved at <<http://msdn.microsoft.com/en-us/library/aa270930 (v=vs.60).aspx>>, Retrieved Date 4111/2011, pp. 1.

"What Is Mixed Language Programming?", Retrieved at <<http://visual-basic-dox.net/MS.Press-Advanced.Microsoft.Vi/advb6/ch11b.htm>>, Retrieved Date Apr. 11, 2011, pp. 11.

\* cited by examiner

HETEROGENEOUS LANGUAGE DATA TYPING WITHOUT EXECUTABLE REGENERATION

BACKGROUND

A given software program's source code may be written in one or more programming languages. BASIC, C, C++, C#, COBOL, FORTRAN, Java, LISP, Pascal, Perl, SQL, and other high-level languages each offer different features, and each may have particular pros and cons for a given programming effort. In some cases, a developer uses different programming languages for different parts of a program. Programs which are written in multiple high-level programming languages are referred to herein as "mixed language" or "heterogeneous language" programs. Software programs written in a single high-level programming language are thus not mixed language programs. Likewise, programs written in a single high-level language combined with pieces of assembly, byte code, or other low-level code (e.g., for routines that access hardware directly or need to be extremely efficient) do use multiple languages, but they are not considered mixed language programs herein because they use only a single high-level language.

A given program's parts may include components, such as classes or groups of classes, or other object-oriented program parts. Component development may be motivated by factors such as reusability, flexibility, modularity, extensibility, error localization, security localization, standardization, and testability, for example. Components of a program may be commercial off-the-shelf items, or they may be custom components written specifically for the program or for another program. In some cases, different components are written in different programming languages. Hence, a given program may include heterogeneous language components, namely, components written in a mix of respective high-level programming languages. Thus, a developer may use a C# component and a SQL component within a single program, to give just one of many possible examples. A given "program" may include multiple cooperating executable files.

SUMMARY

Some approaches to developing a mixed language program have involved regeneration of executables after source code is changed, because one result of regeneration is identification of dependencies between components that are written in different languages. However, executable regeneration can also involve aspects which, in retrospect, are not closely related to source code development of a mixed language program, and dependency analysis could be performed without outputting the binary representation for each component.

Some embodiments described herein obtain data typing information for heterogeneous language components during software development without requiring executable regeneration, such as Common Type System information used in Common Language Infrastructure implementation(s). After automatically noting that a portion of source code of a program has changed, for example, some embodiments automatically identify multiple compiled components of the program which depend on the changed portion of source code. The identified dependent components in question have been compiled from at least two respective high-level programming languages. The embodiment automatically uses one or more cooperating query engine(s) to obtain data typing information of the identified dependent components directly from internal compiler-created structures. A common (shared) model is automatically populated with the obtained data typing information, and utilized for software development operations. Regeneration of a versionable executable code unit which reflects the changed source code is not required to perform the software development operations. Likewise, in some embodiments data typing information is obtained without first requiring a full serialization of a binary which reflects the changed source code.

In some embodiments, the high-level programming languages are each a C-family language, a BASIC-family language, a SQL language, a T-SQL language, or a managed language (e.g., a language managed within a Common Language Infrastructure implementation). Although low-level languages are not a focus of mixed language programs herein, code written in one or more low-level languages may be combined with the high-level programming language source.

Some embodiments obtain data typing information in the form of simple type information, function signatures, and class definitions. In some, the query engine obtains all function signatures and all class definitions from an existing versionable executable code unit (e.g., from an existing SQL assembly or other assembly), and the common model is populated with all of that data typing information. In some embodiments, a query engine is used to obtain data typing information across a project boundary, as well as between high-level programming languages. In some embodiments, when one of the high-level programming languages is SQL or Transact-SQL (T-SQL), the embodiments can automatically generate a Data Definition Language file from the data typing information.

In some embodiments, the software development operation includes autocompletion of a source code identifier, going in source code to a specified definition, finding dependencies in source code to a specified identifier, or a refactoring operation. In some, autocompletion of a source code identifier crosses a boundary between high-level programming languages. In some, going in source code to a specified definition crosses such a boundary, and in some, finding dependencies in source code to a specified identifier crosses such a boundary. In some embodiments, refactoring includes navigating a cross-language dependency.

In some embodiments, the data type query engine(s) collectively have a first type extractor which is specific to a first high-level programming language, a second type extractor which is specific to a second high-level programming language, and a query interface which spans at least the two programming languages, that is, the query interface can be used to extract data typing information from either or both of the high-level programming languages. Some embodiments include a synchronizer in operable communication with the type query engine(s); in some, the synchronizer has a communication mechanism such as a synchronizer—common model interface. Some include a common model in operable communication with the synchronizer; the common model contains data typing information such as a simple type, a function signature, and/or a class definition. In some embodiments, an integrated development environment is in operable communication with the common model. The integrated development environment has one or more features such as a cross-language autocompletion feature, a cross-language refactoring feature, a cross-language dependency finding feature, and/or a cross-language definition go-to feature.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Some approaches to developing a mixed language program have involved regeneration of executables after source code is changed, because one result of regeneration is identification of dependencies between components that are written in different languages. In particular, users creating databases have sometimes kept their T-SQL and SQL CLR (Common Language Runtime) artifacts in separate Visual Studio® projects, which are then subject to manual recompilation after source code changes.

More generally, the design time user experience of software development operations such as autocompletion (e.g., through Microsoft®IntelliSense® functionality), refactoring, and deploying have been limited by inadequate cross-language capability. (Visual Studio®, Microsoft®, and IntelliSense® are registered marks of Microsoft Corporation.) For example, IntelliSense® functionality driven by each language service may be unavailable if one language service has been updated, and an updated artifact in a given language service might not be refactored from a separate language service consuming it. Likewise, context-sensitive actions like "Go to definition" and "Find all references" may be limited or incorrect across languages after an update. Also, T-SQL and SQL CLR artifacts might not be in sync after a user adds, removes or updates SQL-related types.

In retrospect, such limitations may arise from a lack of automatic synchronization across heterogenous language services. Although artifact type information may be kept in a single common model, unless this model is automatically updated as a user's solution evolves through source code changes, the prospect arises that recompilation will be used merely or primarily to produce an assembly artifact which can then be consumed by the model.

Some embodiments described herein provide automatic synchronization across multiple language services with a common model, such as a T-SQL-capable common model or another common model, thereby assisting a user with software development operations that evolve a project. Such synchronization can remove reliance on a regenerated assembly artifact, which would otherwise be produced for consumption by the common model to update the dependencies. Having an automatic synchronization system supports aspects of the developer design time experience such as IntelliSense® usage, refactoring, Go to definition, and find references, helping them work smoothly across multiple language services through the common model. Some embodiments extract all the type information required by the common model from the language services automatically (by polling, interrupts, signals, messages, and/or other automation mechanisms) as the user enters new type information, without producing a physical assembly to be consumed.

In some embodiments, type extraction includes not only types found within a given Visual Studio® SQL Project but also types located across projects (using Project-to-Project references or regular assembly references which were previously compiled). Some embodiments support refactoring on a heterogenous and dynamic (i.e., under development) system, when refactoring is begun on any of the supported languages. Some embodiments support automatic dependency synchronization on a heterogenous and dynamic system. Some support automatic SQL DDL (Data Definition Language) generation. Some support Goto definition, Find References, Dependencies, and other software development operations on a heterogenous and dynamic system.

Some embodiments described herein may be viewed in a broader context. For instance, concepts such as high-level programming languages, data typing, compilation, software development, and common models may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving high-level programming languages, data typing, compilation, software development, or common models are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"BASIC-family language" means BASIC, Visual Basic® language, RealBasic™ language (mark of Real Software, Inc.), and any programming language which has at least a subset that complies with any ANSI BASIC programming language standard for minimal or full BASIC.

"C-family language" means C, C++, C#, Objective-C, and any programming language which has at least a subset that complies with any ANSI C programming language standard.

"CLI-managed languages" means any language (other than assembly, byte code, machine code, and other low-level languages) supported by any Common Language Infrastructure implementation, including without limitation implementations such as Microsoft®.NET™ (marks of Microsoft Corporation), Mono® (mark of Novell, Inc.), and Portable.NET implementations.

"High-level programming language" means a programming language at a higher level of abstraction (distance from the machine) than any of the following low-level languages: assembly language, byte codes, machine opcodes, machine language, binary executable, microcode. Some examples of high-level programming languages are Ada, BASIC-family languages, C-family languages, CLI-managed languages, COBOL, FORTRAN, Java® language (mark of Oracle Corporation), LISP, SQL, Transact-SQL (T-SQL), and memory-managed (subject to garbage collection) languages.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "autocompleting", "executing", "finding", "generating", "going", "identifying", "noting", "obtaining", "populating", "refactoring", "requiring", "using", "utilizing" with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a signal on a wire, for example.

Operating Environments

Figure 1:
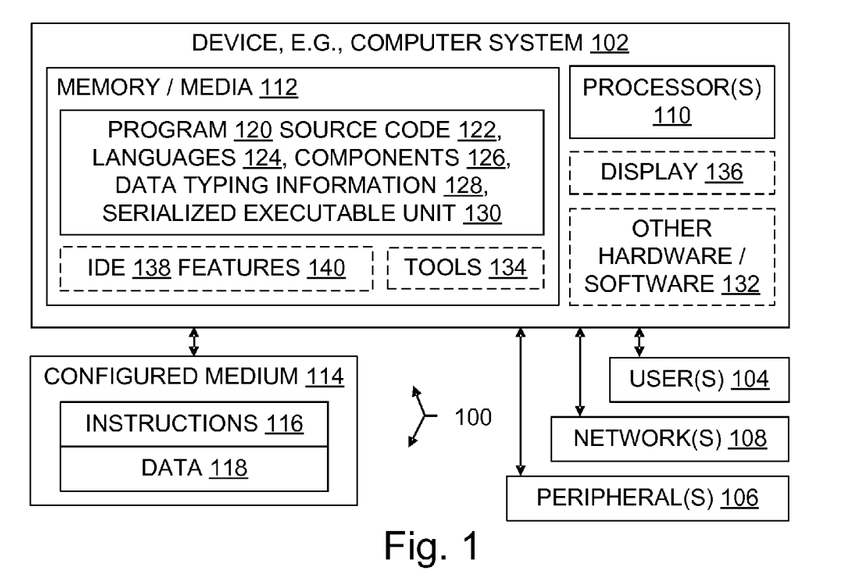
FIG. 1 is a block diagram illustrating a computer system having at least one processor, at least one memory, multi-language program source code under development, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, database administrators, managers, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media, as opposed to media such as a wire that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by extraction, synchronization, and software development operations as discussed herein.

An application, utility, kernel, or other program 120, program source code 122, and other items shown in the Figures and/or discussed in the text may reside partially or entirely within one or more media 112, thereby configuring those media. Program source code 122 is written in programming languages 124, and contains or otherwise defines components 126 and data typing information 128. A serialized executable unit 130 produced using the source code may be present in the system. In addition to processor(s) 110 and configured memory 112, an operating environment may also include other software and hardware 132, such as development tools 134, display(s) 136, buses, power supplies, and accelerators, for instance.

A given operating environment 100 may include an Integrated Development Environment (IDE) 138 which provides a developer with a set of coordinated software development tools and features 140 with functionality for autocompletion, refactoring, going to a definition, finding dependencies, and the like. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
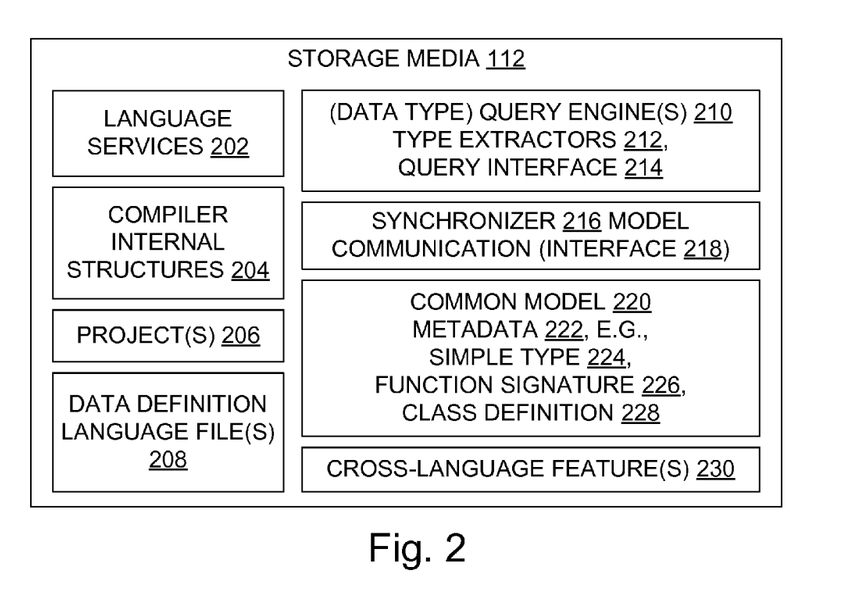
FIG. 2 is a block diagram illustrating aspects of mixed language programming without executable regeneration, in an example architecture.

FIG. 2 illustrates an architecture which is suitable for use with some embodiments. Language services 202 provide compilation, runtime support, and similar support for programming languages 124 used in programs 120. In particular, compilation is supported using familiar compiler internal structures 204 such as symbol tables and parse trees. Programs 120 and their components 126 are organized in one or more projects 206, which may be familiar projects adapted as discussed herein, e.g., adapted to use a familiar notification mechanism to notify a synchronizer when a structure 204 representing data typing information 128 has changed during program development. Projects 206 involving SQL, T-SQL, and/or other database management programming languages 124 may include Data Definition Language files 208 and/or other familiar capabilities.

A query engine 210 (or in some cases multiple coordinated query engines 210) include compiler-specific type extractors 212 which can access the compiler internal structures 204 and extract data typing information from them. Query engine(s) 210 can be implemented in software configuring hardware, to provide the functionality discussed herein. A familiar language service code for parsing or referencing data typing information can be fitted with an interface that is invocable by the engine 210, in order to form an extractor 212, for example. A query interface 214 then makes the extracted typing information 128 available to a synchronizer 216. Synchronizers can be implemented in software configuring hardware, to provide the functionality discussed herein. Through a model interface 218, the synchronizer communicates with a model 220.

In some embodiments, the model 220 is a common (i.e., shared) model which provides a resource that presents development features 140 with a unified form of access to metadata 222 (including at least data typing information 128) for disparate components 126 written in multiple languages 124. In particular, some embodiments of the model 220 include data typing information 128 in the form of simple type 224 (integer, floating point, character, etc.) information 128, function signature 226 information 128 (including functions that return values and void functions, a.k.a., procedures), and class definition 228 information 128. Existing models, such as familiar Common Language Infrastructure implementation models, can be fitted with an interface 218 or other familiar communication mechanism adapted to accept input from a synchronizer.

In some embodiments, the information stored in the common model can include definitions of model elements and relationships between model elements. This allows various types of database artifacts to exist in the same project and to be correctly processed by program development tools. For example, a T-SQL file can be interpreted and database elements created when the T-SQL file is executed can be added to the common model, an XML Schema Definition file can be determined to be a part of an XML Schema Collection and the schema collection definition can be added to the common model and/or a program file can be compiled into an executable (e.g., compiled into an assembly as a SQL CLR artifact)

and definitions found in the executable can be added to the common model. Information derived from compiled or interpreted code can be added to the common model. For example, definitions for public types found in the assembly can be added to the common model. Placing artifact definitions and relationships between artifacts in a common model (e.g., common model 220) allows information about the objects (including but not limited to types, names, dependencies, validation rules for values for the object, physical location, relationships between objects and so on) to be available to the tools in the IDE 138.

In some embodiments, the synchronizer 216 maintains the currency of data typing information to update the model 220 as a developer makes changes in source code 122. Thus, the synchronizer 216, query engine 210, and model 220 collectively provide support for cross-language features 230, namely, software code and hardware that implement features 140 which cross a boundary between two or more high-level programming languages 124.

With reference to FIGS. 1 and 2, some embodiments provide a computer system 102 with a logical processor 110 and a memory medium 112 configured by circuitry, firmware, and/or software to transform source code 122 changes into a model containing current data typing information 128 as described herein. For example, some embodiments include a logical processor 110, a memory 112 in operable communication with the logical processor, and at least one data type query engine 210 residing in the memory. The query engine (s) 210 collectively have a first type extractor 212 which is specific to a first high-level programming language 124, a second type extractor 212 which is specific to a second high-level programming language 124, and a query interface 214 which spans at least the two programming languages (e.g., by providing in a unified format data typing information 128 from the extractors 212).

In some embodiment, the high-level programming languages are each in a group consisting of: C-family languages, BASIC-family languages, SQL languages (implementations of Sequential Query Language), T-SQL languages (Transact-SQL implementations), CLI-managed languages (Common Language Infrastructure implementations). In some embodiments, at least one language is neither a SQL nor a T-SQL language.

Some embodiments include a synchronizer 216 residing in the memory in operable communication with the data type query engine(s) 210. In some, the synchronizer has a synchronizer—common model interface 218 (equivalently, the interface 218 and/or another communication mechanism may be implemented as part of the model 220). Embodiments which are viewed as not including the synchronizer may nonetheless operate in the context of a synchronizer, that is, the operating environment 100 may include a synchronizer and/or synchronizer results.

Some embodiments include a common (shared) model 220 in operable communication with the synchronizer 216. In some, the common model 220 contains at least one of the following kinds of data typing information 128: a simple type 224, a function signature 226, a class definition 228. In some, the model 220 contains only a proper subset of such data typing information 128.

Some embodiments include an integrated development environment 138 in operable communication with the common model 220. In some, the integrated development environment has at least one of the following: a cross-language autocompletion feature 230; a cross-language refactoring feature 230. Some embodiments include other or different development features 140, 230.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, program 120 components 126 may be on multiple devices/systems 102 in a networked cloud, source code 122 may be stored on yet other devices within the cloud, and the synchronizer 216 may configure memory on yet other cloud device(s)/system(s) 102.

Processes

Figure 3:
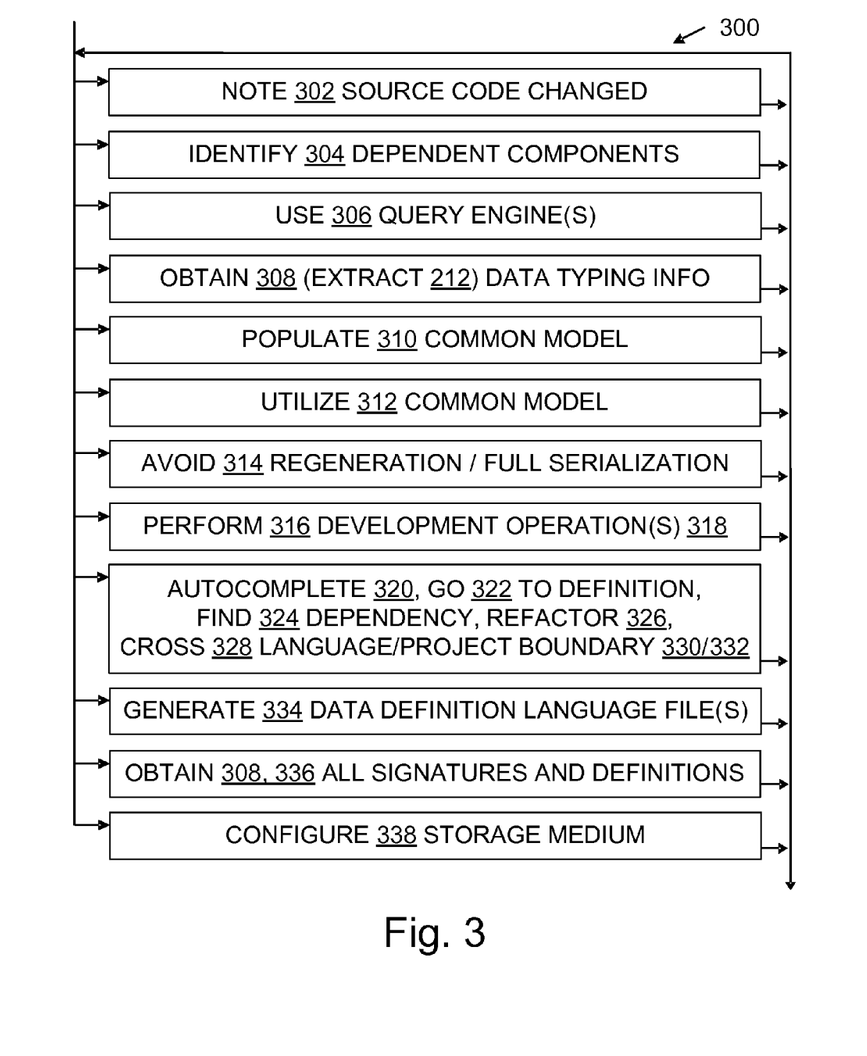
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by a synchronizer 216, query engine 210, and model 220 driven by requests from an IDE 138 under control of a script or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a source change noting step 302, an embodiment notes that source code 122 has been changed. Step 302 may be accomplished using familiar mechanisms in language services 202 and/or in IDEs 138, for example.

During a dependent components identifying step 304, an embodiment identifies program components 126 that depend on the changed source code.

Step 304 may be accomplished using familiar static analysis mechanisms, for example.

During a query engine using step 306, an embodiment uses a data type query engine 210, namely, an engine designed to obtain data typing information 128. Step 306 may be accomplished by invoking type extractors 212, for example.

During a data typing information obtaining step 308, an embodiment obtains data typing information 128. Step 308 may be accomplished using software and hardware configured to extract compiler-created data typing information from internal structures 204, for example. Note that source is compiled internally to extract the type information, but not necessarily compiled from the user point of view. Some embodiments do not rely on a binary being output but rather utilize internal representation(s) in the compiler for the available types (e.g., by utilizing an abstract syntax tree).

During a model populating step 310, an embodiment populates a model 220 with data typing information 128. Step 310 may be accomplished using familiar model and model population mechanisms, adapted to provide a model which contains current data typing information across language boundaries after source code changes without an intervening full unit 130 serialization, for example.

During a model utilizing step 312, an embodiment (or a user employing an embodiment) utilizes a model 220, such as by utilizing data typing information 128 from the model while performing 316 software development operation(s) 318.

During an avoiding step 314, an embodiment avoids regeneration of an executable, e.g., by performing some operation 318 without using information produced by a regeneration of a unit 130 and without doing the regeneration. Step 314 may also be performed by avoiding full serialization of a binary, e.g., by performing some operation 318 without using information produced by a full serialization and without doing the full serialization to create a unit 130.

During a development operation performing step 316, an embodiment (or a user employing an embodiment) performs one or more "software development operations" 318, such as an autocompletion 320, going 322 to a definition, finding 324 a dependency, and/or refactoring 326. Performance 316 of a given operation 318 may cross 328 a programming language boundary 330 and/or cross 328 a project 206 boundary 332.

During a DDL file generating step 334, an embodiment generates one or more Data Definition Language files 208. This may be done, for example, when a SQL project is used. Step 334 may be accomplished using familiar DDL file generation mechanisms, in the context of cross-language features 230, for example.

During an all type info obtaining step 336, which is an example of data typing (e.g., type) information obtaining step 308, an embodiment obtains all function signatures 226 and class definitions 228 from an executable unit 130. Step 336 may be accomplished using familiar mechanisms for extracting typing information from an assembly or other unit 130, for example.

During a memory configuring step 338, a memory medium 112 is configured by a synchronizer 216, by code implementing a cross-language feature 230, and/or otherwise in connection with heterogeneous language software development without unit 130 regeneration, as discussed herein.

The foregoing steps and their interrelationships are discussed in greater detail below, in connection with various embodiments.

Some embodiments provide a process for obtaining data typing information for heterogeneous language components during software development without requiring executable regeneration. Portions of the process may be performed by a machine automatically.

In some embodiments, the process includes automatically noting 302 that a portion of source code 122 of a program 120 has changed, and automatically identifying 304 multiple compiled components 126 of the program which depend on the changed portion of source code. In cases of greater interest, the identified dependent components have been compiled from at least two respective high-level programming languages 124. In a given situation, more than two components 126 may be present, and it may occur that some of the components come from the same programming language.

This process continues by automatically using 306 a query engine 210 to obtain data typing (e.g., type) information 128 of the identified dependent components directly from internal compiler-created structures 204; this may occur while avoiding 314 a full serialization of a binary which reflects the changed source code. Then the process automatically populates 310 a common model 220 with the obtained data typing information, and the common model is utilized 312 for a software development operation 318, e.g., by performing 316 a software development operation based on the common model while avoiding 314 regeneration of a versionable executable code unit 130 which reflects the changed source code.

In some embodiments, the query engine 210 is responsible for making the type enumeration between different languages be seen as a homogenous type system from the developer 104 point of view. Unlike situations such as those in which getting internal type information for one language (e.g., Microsoft Visual Basic® code) involves different tools and procedures than getting internal type information for another language (e.g., C# code), the query engine 210 talks directly to the internal structures 204 in each supported language. The query engine 210 thereby provides a unified tool and procedure for obtaining data typing information 128 across multiple high-level programming languages 124.

A "versionable executable code unit" is an assembly or another unit 130 of executable code which is versionable. Versionable executable code units are not limited to assemblies or other executable code units produced in the context of a Visual Studio® IDE, a Microsoft®-provided compiler, and/or another Microsoft®-tool-based development environment (marks of Microsoft Corporation). For example, performing a full serialization of a binary representation of code will produce a versionable executable code unit, regardless of whether the serialization is performed in a Microsoft®-tool-based development environment. In the context of utilizing step 312, although some compilation may well be done by each involved language, a full serialization of the binary representation is not performed (e.g., the assembly or other unit 130 is not written to the disk).

In some embodiments, the high-level programming languages 124 are each in a group consisting of: a C-family language, a BASIC-family language, a SQL language, and a T-SQL language. Note that even when some number N greater than two languages are listed for a given group G, a given embodiment that supports only two of the languages satisfies the definition of the group G if G's context calls for at least two languages. Likewise, an embodiment that supports at least two listed languages but not all of the listed languages also satisfies the definition.

For example, if a group G is defined by listing "a C-family language, a BASIC-family language, a SQL language, and a T-SQL language" then an embodiment E1 that supports only C# and T-SQL satisfies the definition of G, and so does an embodiment E2 that supports C#, Visual Basic®, and T-SQL but not SQL. Likewise, an embodiment E3 that supports C#, T-SQL, and COBOL satisfies the definition of G even though COBOL is not listed for G, because at least two languages listed for this group G are supported.

In some embodiments, each managed high-level programming language 124 has a specific type extractor 212 for the query engine. This type extractor is responsible for mapping a common query (i.e., one applicable to multiple languages) to internal type structures 204, allowing the engine 210 to provide the type information 128 in a homogenous manner so the user 104 is freed from manually utilizing details of the underlying specific behavior for obtaining data typing information. In general, the type extractor reads the internal data structures and exposes them, allowing the query engine to operate over them as it would operate over type information from some other language.

In some embodiments, the data typing information 128 includes at least one of the following: a simple type, a function signature, a class definition. More generally, the query engine 210 may query any type information 128 that is exposed by the metadata 222 available within the assembly or other unit 130.

In some embodiments, the software development operation 318 includes at least one of the following: autocompletion of a source code identifier, going in source code to a specified definition, finding dependencies in source code to a specified identifier, refactoring. For example, some embodiments extract 212 the type information exposed from each language service 202 the program interacts with, and populate 310 a T-SQL common model 220. The common model can then be used to support development operations such as providing autocompletion 320 (e.g., Microsoft IntelliSense® functionality), going 322 in source code to a specified definition, and so on.

One point of interest may be cross-language interaction. Approaches that rely on having a pre-compiled assembly in order to get all type information do not support changing anything within that assembly. By contrast, some of the present embodiments support development operations 318 across language boundaries. For example, some embodiments support a refactoring 326 operation that crosses 328 a language boundary 330. A developer could rename or otherwise refactor 326 a type from T-SQL all the way to another language 124 where the type is defined. A developer could also start an item X refactoring operation 318 from an origin language 124 and as part of that refactoring have an embodiment automatically change all references to X that are used in the T-SQL language portion of the program source code.

More generally, in some embodiments the software development operation 318 includes at least one of the following: refactoring 326 that includes navigating a cross-language dependency; autocompletion 320 of a source code identifier across a boundary between high-level programming languages; going 322 in source code across a boundary between high-level programming languages to a specified definition; finding 324 dependencies in source code to a specified identifier across a boundary between high-level programming languages. With regard to boundaries, in some embodiments the query engine(s) are also used to obtain 308 data typing information across a project boundary 332 as well as between high-level programming languages.

In some embodiments, one of the high-level programming languages is one of the following: SQL, Transact-SQL, and the process also includes automatically generating 334 a Data Definition Language file from the data typing information.

In some embodiments, the query engine 210 obtains 336 all function signatures and all class definitions from an existing versionable executable code unit 130 (e.g., from an existing SQL assembly), and the common model 220 is populated 310 with all of that data typing information. In some configurations the existing versionable executable code unit 130 is a SQL assembly. It will be understood that a SQL assembly is a regular assembly having a set of predefined SQL attributes. This assembly gets validated at deployment type and if valid, can be used within Microsoft SQL Server® solutions. Such a specific assembly is also known as a SQL-CLR assembly; at a byte level it is a CLR (Microsoft Common Language Runtime) assembly.

Configured Media

Some embodiments include a configured computer-readable storage medium 112. Medium 112 may include disks (magnetic, optical, or otherwise), RAM, EEPROMS or other ROMs, and/or other configurable memory, as opposed to wires and other propagated signal media. The storage medium which is configured may be in particular a removable storage medium 114 such as a CD, DVD, or flash memory. A general-purpose memory, which may be removable or not, and may be volatile or not, can be configured into an embodiment using items such as cross-language features 230, a synchronizer 216, and code that performs the methods claimed, in the form of data 118 and instructions 116, read from a removable medium 114 and/or another source such as a network connection, to form a configured medium. The configured medium 112 is capable of causing a computer system to perform process steps for transforming source code changes into current model content as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

It will be understood that SQLCLR technology (sometimes referred to with "SQL CLR") facilitates hosting the Microsoft .NET common language runtime engine within Microsoft® SQL Server® environments (marks of Microsoft Corporation). The SQLCLR technology thus allows managed code to be hosted by, and run in, the Microsoft SQL Server® environment. This technology, introduced in Microsoft SQL Server® 2005, allows users to create managed code objects in SQL Server environments in .NET languages such as C# or VB.NET, including the following: (a) Stored procedures (SPs) which are analogous to procedures or void functions in procedural languages like the Microsoft® Visual Basic® language or C, (b) triggers which are stored procedures that fire in response to Data Manipulation Language (DML) or Data Definition Language (DDL) events, (c) User-defined functions (UDFs) which are analogous to functions in procedural languages, (d) User-defined aggregates (UDAs) which allow developers to create custom aggregates that act on sets of data instead of one row at a time, (e) User-defined types (UDTs) that allow users to create simple or complex data types which can be serialized and deserialized within the database. The SQL CLR technology involves the creation, deployment, and registration of .NET assemblies, which are physically stored in managed code dynamic load libraries (DLLs). These assemblies may contain .NET namespaces, classes, functions and properties.

Manual deployment within familiar SQLCLR implementations involved registering and executing managed code in the database with steps such as the following. In this approach, a developer writes a managed program as a set of class definitions. SQL Server® routines—stored procedures, functions, or triggers—are written as static (or Shared in Microsoft Visual Basic®.NET) methods of a class. User-defined types and aggregates are written as entire classes. The developer compiles the code and creates an assembly. The assembly is uploaded into a SQL Server® database, where it is stored in the system catalogs using the CREATE ASSEMBLY data definition language (DDL) statement. Transact-SQL (T-SQL) objects, such as routines, types, and aggregates are then created and bound to entry points (methods in the case of routines and classes for types and aggregates) in the assembly that has been already uploaded. This is accomplished using the CREATE PROCEDURE/FUNCTION/TRIGGER/TYPE/AGGREGATE statements. After routines are created, they can be used like T-SQL routines by applications. For example, CLR functions can be called from T-SQL queries and CLR procedures can be called from a client application or from a T-SQL batch as if they were T-SQL procedures.

Some approaches provide a SQL Server® project type which would allow a user to define T-SQL and C#/VB (Visual Basic®) artifacts within the same project. A single Visual Studio® SQL project is thus used to hold heterogeneous database artifacts' definitions such as T-SQL and/or VB/C# code. Some approaches also allow a given project to have a Project-to-Project reference against another Visual Studio® SQL Project or to a Visual Studio® C# or VB project type. In order to enable the interaction where a SQLCLR type of function could be invoked, it is first understood by the common model. The function is registered, as it is registered by SQL Server® technology when it gets deployed. All types and functions within the managed assembly are extracted and automatically catalogued within the common model.

Beyond the foregoing, some embodiments provide a related mechanism using already compiled assemblies. With such embodiments, the user 104 can work on the C#/VB artifacts and automatically include them without recompiling the assembly after each edit. This allows utilization of the common model 220 to support refactoring, IntelliSense® autocompletion, go to reference, and other operations 318.

Figure 4:
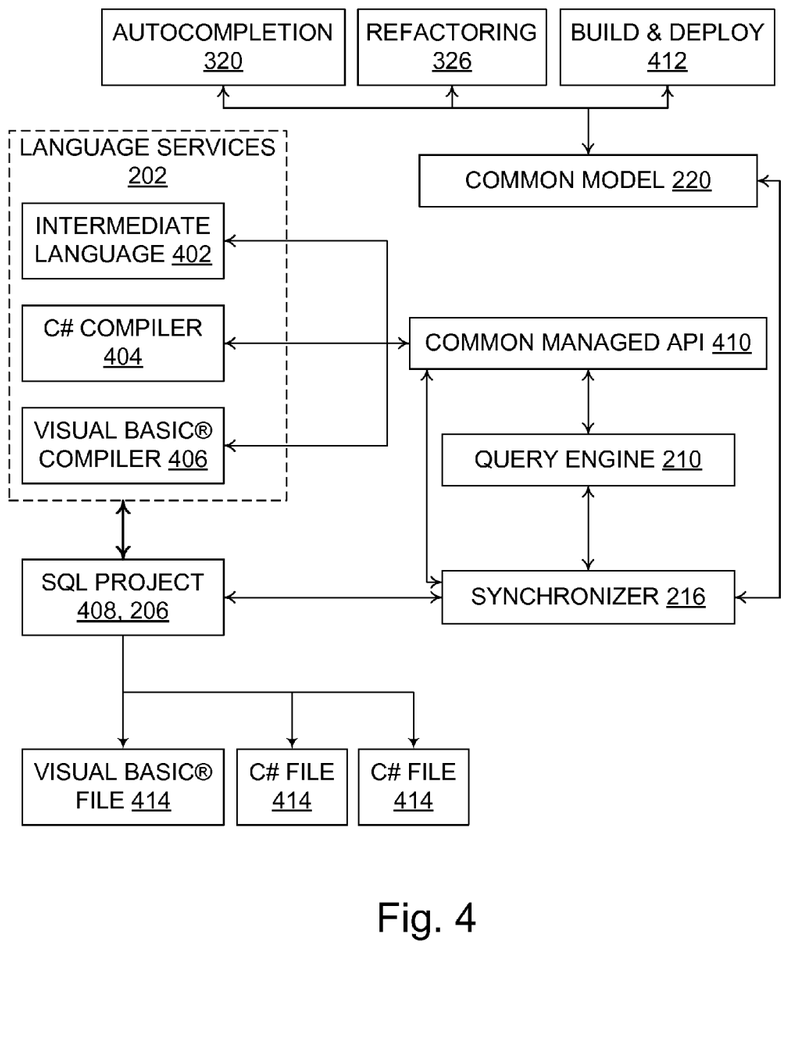
FIG. 4 is a data flow diagram illustrating aspects of data typing information support for mixed language software operations in an example architecture.

By way of further illustration, consider an example configuration shown in FIG. 4, in conjunction with the other Figures. In operation, a managed code source artifact is authored by creating or otherwise editing source code 122. A language service 202 owner of the given source code artifact parses and interprets the source code changes. Such an owner may include, for example, an intermediate language 402 generator, a C# compiler 404, a Visual Basic® compiler 406, or another compiler/interpreter/code generator (each referred to here for convenience as a "compiler"). A SQL Project 408 gets notified that the owning compiler's internal structure 204 has been updated. More generally, in a project-to-project reference, a SQL project may reference a C# project, or vice versa. The SQL Project 408 notifies a Synchronizer 216 to capture the new compiler state and extract 212 the SQLCLR specific information out of the project by navigating all the required dependencies by accessing the Query Engine 210. The Query Engine 210 unifies the way that different exogenous artifacts expose the internal compiler structures, and extracts all the type information 128 required by the common model 220. Each language service or required artifact (e.g. assembly) is queried, via a common managed API 410. In some embodiments, the common model is consumed by the SQL Project. In some, the autocompletion 320, refactoring 326, and build & deploy 412 features are language-specific, e.g., specific to a SQL project case, and if a C# project is used, the features have their own C# blocks.

The information 128 obtained is used to populate 310 the common model. IntelliSense® autocompletion and other features 140, such as a build and deploy 412 of files 414, now have information about the dynamic and heterogenous system in the model to expose in the T-SQL Editor of the IDE 138 or other editing tool 134. For example, refactoring 326 can be accomplished by navigating the cross-language dependencies to understand what piece would be affected if anything in that chain is to be changed. Each language service 202 can be responsible for refactoring that language's piece of the owning source code artifact that is being updated.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process for obtaining data typing information for heterogeneous language components during software development without requiring executable regeneration, portions of the process performed by a machine automatically, the process comprising the steps of:
   automatically noting that a portion of source code of a program has changed;
   automatically identifying multiple compiled components of the program which depend on the changed portion of source code, the identified dependent components having been compiled from at least two respective high-level programming languages;
   automatically using a single query engine to obtain data typing information of the identified dependent components directly from internal compiler-created structures;
   automatically populating a common model with the obtained data typing information; and
   utilizing the common model for a software development operation while avoiding regeneration of a versionable executable code unit which reflects the changed source code.

2. The process of claim 1, wherein the high-level programming languages are each in a group G consisting of: a C-family language, a Basic-family language, a SQL language, and a T-SQL language.

3. The process of claim 1, wherein the data typing information includes at least one of the following: a simple type, a function signature, a class definition.

4. The process of claim 1, wherein the software development operation includes at least one of the following: autocompletion of a source code identifier, going in source code to a specified definition, finding dependencies in source code to a specified identifier, refactoring.

5. The process of claim 1, wherein the software development operation comprises at least one of the following:
   refactoring that includes navigating a cross-language dependency;
   autocompletion of a source code identifier across a boundary between high-level programming languages;
   going in source code across a boundary between high-level programming languages to a specified definition;
   finding dependencies in source code to a specified identifier across a boundary between high-level programming languages.

6. The process of claim 1, wherein the single query engine is used to obtain data typing information across a project boundary between high-level programming languages.

7. The process of claim 1, wherein one of the high-level programming languages is one of the following: SQL, Transact-SQL, and wherein the process also includes automatically generating a Data Definition Language file from the data typing information.

8. The process of claim 1, wherein the query engine obtains all function signatures and all class definitions from an existing versionable executable code unit, and wherein the common model is populated with all of that data typing information.

9. A computer-readable storage medium configured with data and with instructions that when executed by at least one processor causes the processor(s) to perform a process for obtaining data typing information for heterogeneous language components during software development, the process comprising the steps of:
   identifying multiple compiled components of a program which depend on a changed portion of the program's source code, the identified dependent components having been compiled from at least two respective high-level programming languages;
   using a single query engine to obtain data typing information of the identified dependent components directly from compiler-created structures without first requiring a full serialization of a binary which reflects the changed source code;
   populating a common model with the obtained data typing information; and
   performing a software development operation based on the common model.

10. The configured medium of claim 9, wherein the data typing information includes at least one of the following: a simple type, a function signature.

11. The configured medium of claim 9, wherein the software development operation includes at least one of the following:
   refactoring which crosses a boundary between high-level programming languages;
   autocompletion of a source code identifier across a boundary between high-level programming languages.

12. The configured medium of claim 9, wherein the software development operation includes going in source code across a boundary between high-level programming languages to a specified definition.

13. The configured medium of claim 9, wherein the software development operation includes finding dependencies in source code to a specified identifier across a boundary between high-level programming languages.

14. The configured medium of claim 9, wherein the process includes obtaining data typing information across a project boundary.

15. The configured medium of claim 9, wherein the process further comprises automatically generating a Data Definition Language file from the data typing information.

16. A computer system comprising:
   a logical processor;
   a memory in operable communication with the logical processor;
   at least one data type query engine residing in the memory, the query engine(s) collectively having a first type extractor which is specific to a first high-level programming language, a second type extractor which is specific to a second high-level programming language, and a query interface which spans at least the two programming languages;
   multiple compiled components identified in a program, the identified components being dependent on a changed portion of source code, the identified components having been compiled from the first high-level programming language and the second high-level programming language;

the first type extractor and the second type extractor configured to obtain data typing information of the identified dependent components directly from internal compiler-created structures;

a common model of data typing information which spans at least the two programming languages, the common model in operable communication with the query interface when populating the common model with the data typing information; and a result of performing a software development operation based on the common model.

17. The system of claim 16, further comprising a synchronizer residing in the memory in operable communication with the data type query engine(s), the synchronizer having a synchronizer—common model interface.

18. The system of claim 16, wherein the common model contains at least one of the following kinds of data typing information: a simple type, a function signature, a class definition.

19. The system of claim 16, further comprising an integrated development environment in operable communication with the common model, the integrated development environment having at least one of the following:

a cross-language autocompletion feature;

a cross-language refactoring feature.

20. The system of claim 16, wherein the high-level programming languages are each in a group G consisting of: C-family languages, BASIC-family languages, SQL languages, T-SQL languages, languages managed within a Common Language Infrastructure implementation.

* * * * *